Nov. 10, 1936.  E. J. CARLETON  2,060,175
CLUTCH MECHANISM
Filed Sept. 26, 1934
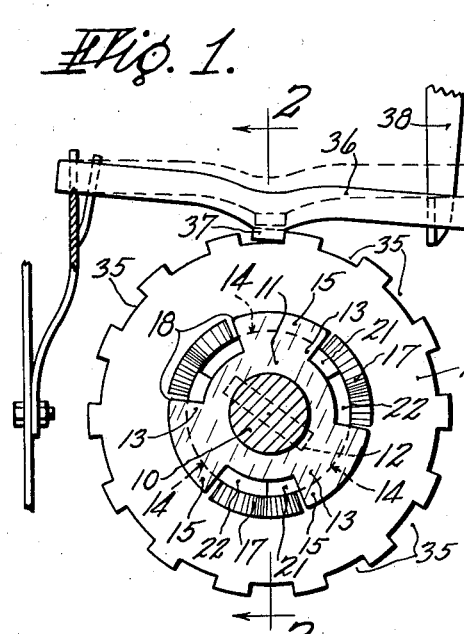
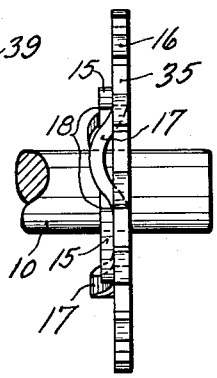
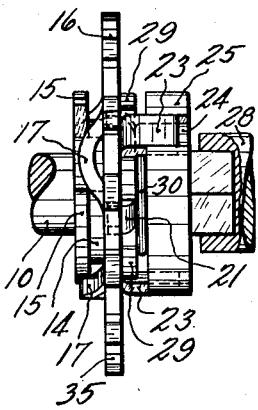
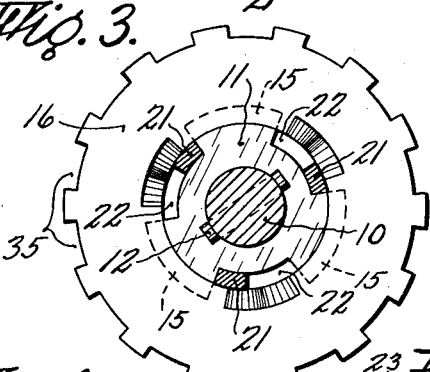
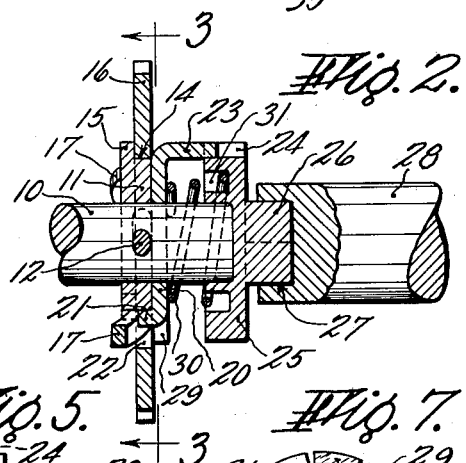
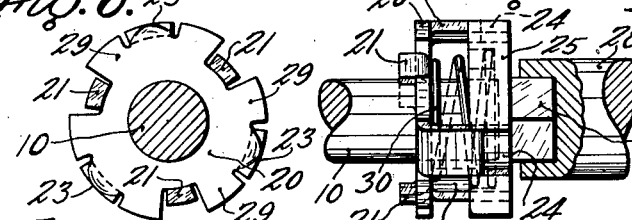
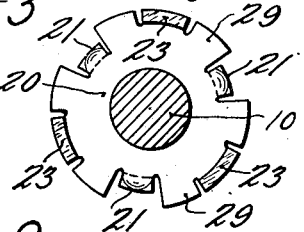
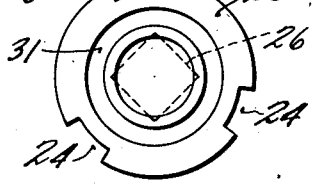
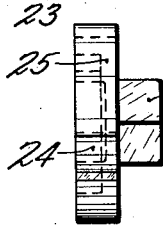
INVENTOR
EMILE J. CARLETON
BY Chapin + Neal
ATTORNEYS Patented Nov. 10, 1936

2,060,175

UNITED STATES PATENT OFFICE 2,060,175

CLUTCH MECHANISM

Emile J. Carleton, Holyoke, Mass.

Application September 26, 1934, Serial No. 745,584

2 Claims. (Cl. 192—24)

This invention relates to a clutch mechanism and has as its principal object the provision of a clutch mechanism which includes means for disconnecting the clutch members, sufficiently rapid and positive in operation to meet the requirement of safety devices, where it is essential that the clutch shall be disengaged promptly and automatically in response to the operation of the safety mechanism.

Other and further objects residing in the details of construction will be apparent from the following specification and claims:

In the accompanying drawing which illustrates one embodiment of the invention,

Fig. 1 is an end view of the device including certain elements of a safety device;

Fig. 2 is a section substantially on line 2—2 of Fig. 1 showing the clutch members in engaged position;

Fig. 3 is a sectional view substantially on line 3—3 of Fig. 2;

Fig. 4 is a side view of the driven clutch member and the clutch disengaging member;

Fig. 5 is a side view of the driving member of the clutch;

Fig. 6 is a view of the movable clutch element of the structure shown in Fig. 5 looking from the left of said figure;

Fig. 7 is a view of the opposite side of the element shown in Fig. 6;

Fig. 8 is a detail side view of the fixed element of the driving member of the clutch;

Fig. 9 is a view of the element shown in Fig. 8 looking from the left of said figure; and Fig. 10 is a side view of the clutch assembly when in disengaged position.

Referring to the drawing, 10 designates a shaft which for convenience of reference is called the driven shaft and to which driven clutch member 11 is secured as by a pin 12. Member 11 is formed with a plurality of radially extending lugs or projections 13, the outer portions of which are shouldered to approximately half their depth to form arcuate bearing surfaces 14 and flanges 15. An annular disc 16 is mounted to rotate freely on the bearing surfaces 14, the flanges 15 engaging the surface of the disc 16 adjacent its inner periphery as best shown in Fig. 2, and forming cam engaging surfaces as later described. The disc 16 is provided with a plurality of arcuate cam members 17 formed by striking up parts of the inner peripheral portion of the disc. The number, position and circumferential dimensions of the cam members 17 correspond to the spaces 18 formed between flanges 15 and as best shown in Figs. 1 and 2, are normally positioned in said spaces with the flanges 15 in engagement with the intervening smooth face of the disc.

The driving member of the clutch includes an annular member 20 positioned on the opposite side of disc 16 from cams 17 and provided with fingers 21 which normally extend into the spaces 22 between the inner periphery of disc 16 and member 11 so as to engage the sides of lugs 13 as shown in Fig. 1. Member 20 is further provided with a plurality of oppositely extending fingers 23 adapted to slide in grooves 24 formed in the peripheral surface of a dog 25 provided with a squared extension 26 fitting in a squared recess 27 of the driving shaft 28. A coiled spring 30 is positioned between dog 25 and member 20 normally holding portions 29 of the member 20 against disc 16 and fingers 21 in driving engagement with lugs 13. A groove 31 formed in dog 25 retains the spring in position. As will be clear from Fig. 2, the spring 30 holds the member 20 and dog 25 spaced a distance from each other slightly in excess of the length of fingers 21, the fingers 23 being of sufficient length to maintain their engagement in grooves 24 in all relative positions of member 20 and dog 25.

Figs. 1 and 2 show the clutch members in driving relation and it will be seen that rotation imparted to dog 25 by shaft 28 is transmitted through grooves 24 and fingers 23 to member 20 which in turn through fingers 21 drives member 11 which is secured to shaft 10. It will be noted that the driving connection is directly from member 20 to member 11 through the opening in disc 16 and that the latter resting freely on bearing surfaces 14 rotates with member 11.

If disc 16 is held against rotation, or upon angular displacement between the disc and the flanges 15 the clutch members are automatically disengaged as shown in Fig. 10 in the following manner. With disc 16 held stationary, or its rotation advanced or retarded with respect to the clutch members, continued constant rotation of member 11 causes flanges 15 to engage cam members 17, thereby moving the disc 16 transversely along bearing surfaces 14 and forcing member 20 against the action of spring 30 to the position shown in Fig. 10, thus withdrawing fingers 21 from driving engagement with lugs 13.

As long as disc 16 is held stationary cams 17 will remain engaged with flanges 15, since member 11 of course comes to rest as soon as fingers 21 are withdrawn, and member 20 will rotate idly against the stationary surface of disc 16. As shown, the height of cams 17 is such that the clutch members are disengaged and member 11 is brought to rest with the flanges 15 on the inclined portion of the cam surface so that when disc 16 is released it is automatically returned to original position by the action of spring 30. Obviously, if the rotation of the disc is advanced or retarded rather than stopped, the cams 17 would traverse the flanges to effect reengagement of the clutch members.

Any suitable braking or other means may be employed to restrain the rotation of disc 16, and such means may be operative in response to "safety" means, time controlled means designed to control a sequence of operation, or in response to manual operation. In the drawing disc 16 is shown provided around its outer edge with a plurality of recesses 35. A pivoted bar 36 carrying a lug 37 is normally held spaced above the disc by a hood or latch 38 as shown in dotted line in Fig. 1. When hook 38 is withdrawn by the operation of a safety device or other actuating means, not shown, bar 36 descends under the action of spring 39 causing lug 37 to engage in the first recess 35 presented by the disc in its rotation, thus locking disc 16 against further rotation. It will be obvious that if desired the disengagement of the clutch could be made to always take place at a specific point or points in the rotation of the shaft 10 by properly positioning one or more recesses 35 on the periphery of the disc 16.

It will of course be understood that the clutch members may be secured to the shafts in various ways and that the clutch members may be modified to meet the requirements of such differing securing means or various desired arrangements of the shafts, without departing from the scope of my invention.

I claim:

1. A clutch comprising two clutch members adapted to be respectively secured to driving and driven members, yielding means acting to press the driving clutch member into driving engagement with the driven clutch member, a bearing formed on the driven clutch member, an annular disc rotatably mounted on said bearing and having one face in engagement with the driving member of the clutch, a cam formed on the opposite face of the disc, and a cam surface carried by the driven clutch member positioned to be circumferentially offset from said cam when the clutch members are in engagement and engageable with said cam to move the driving member of the clutch out of engagement with the driven clutch member upon angular displacement between the disc and the driven clutch member.

2. A clutch comprising a driven clutch member having a hub portion provided with spaced radially extending lugs, the ends of each lug being shouldered to form a bearing surface with a flange at one side thereof, an annular disc rotatably mounted on said bearing surfaces, cam members struck up from the disc, said cam members normally positioned between the flange portions of the lugs, a driving clutch member having a plurality of fingers projecting from one side thereof adapted to extend through the central opening of the annular disc and into engagement with the radial lugs of the driven clutch member, a plurality of fingers extending from the opposite face of the driving clutch member, a dog having recesses in which the last named fingers slidably engage, and a spring positioned between said dog and the driving clutch member to normally hold the latter in driving engagement with the driven clutch member, and radially extending portions on the driving clutch member engaging the face of the annular disc member, said cam members being of sufficient thickness to cause disengagement of the first named fingers and lugs when engaged by said flanges upon angular displacement between the annular disc and the driven clutch member.

EMILE J. CARLETON.